US00RE34093E

United States Patent [19]

Powell et al.

[11] E Patent Number: Re. 34,093

[45] Reissued Date of Patent: Oct. 6, 1992

[54] AQUEOUS ADHESIVE COMPOSITIONS

[76] Inventors: Clois E. Powell, 658 Vancouver, Westerville, Ohio 43081; Gary L. Linden, 808 Savoie, Bowling Green, Ohio 43402

[21] Appl. No.: 759,910

[22] Filed: Jul. 29, 1985

Related U.S. Patent Documents

Reissue of:

[64] Patent No.: 4,396,738
Issued: Aug. 2, 1983
Appl. No.: 381,620
Filed: May 24, 1982

[51] Int. Cl.[5] ..... C08L 75/00

[52] U.S. Cl. ..... 524/228; 524/229; 524/507; 524/555; 524/813

[58] Field of Search ..... 524/228, 229, 555, 507, 524/813; 528/45; 252/182

[56] References Cited

U.S. PATENT DOCUMENTS

| | | | |
|---|---|---|---|
| 3,178,385 | 4/1965 | Dirges et al. | 524/813 |
| 3,318,836 | 5/1967 | Joyce | 524/385 |
| 3,791,849 | 2/1974 | Hammer et al. . | |
| 3,931,088 | 1/1976 | Sakurada et al. . | |
| 3,992,316 | 11/1976 | Pedain et al. | 252/182 |
| 3,996,154 | 12/1976 | Johnson et al. . | |
| 4,079,028 | 3/1978 | Emmons et al. . | |
| 4,096,291 | 6/1978 | Dunwald et al. | 528/45 |
| 4,135,491 | 11/1978 | Gorman . | |
| 4,191,833 | 3/1980 | Tucker | 524/813 |
| 4,260,532 | 4/1981 | Reuther et al. . | |
| 4,340,682 | 7/1982 | Leque et al. | 524/507 |
| 4,396.738 | 8/1983 | Powell et al. | 524/228 |
| 4,433,095 | 2/1984 | Hombach et al. . | |
| 4,472,230 | 9/1984 | Sachs et al. . | |
| 4,476,276 | 10/1984 | Gasper | 524/507 |

FOREIGN PATENT DOCUMENTS

| | | | |
|---|---|---|---|
| 0019375 | 11/1980 | European Pat. Off. . | |
| 1435466 | 3/1966 | France | 528/45 |
| 53-56232 | 5/1978 | Japan | 524/507 |
| 1129408 | 10/1968 | United Kingdom . | |
| 1162409 | 8/1969 | United Kingdom | 524/813 |
| 1417618 | 12/1975 | United Kingdom . | |
| 1444933 | 8/1976 | United Kingdom . | |
| 2066813 | 7/1981 | United Kingdom . | |
| 1601033 | 10/1981 | United Kingdom . | |

*Primary Examiner*—Joseph L. Schofer
*Assistant Examiner*—N. Sarofim

[57] ABSTRACT

Novel aqueous adhesive and coating compositions composed of (1) an aqueous emulsion (latex) or dispersion of a polymer or interpolymer of one or more vinyl monomers such as an emulsion of a copolymer of vinyl acetate and butyl acrylate and (2) an aqueous emulsion or dispersion of a polyisocyanate which has at least partially reacted with an alcohol having the formula ROH wherein R is a hydrocarbon radical having [at least one carbon atom] *from six to 30 carbon atoms* and wherein the dispersion or emulsion (2) is stabilized with a combined surfactant and alcohol having the formula R′ wherein R′ is a hydrocarbon radical having at least one carbon atom are described.

7 Claims, No Drawings

AQUEOUS ADHESIVE COMPOSITIONS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a water-base adhesive and coating agent which is especially useful for the coating and bonding of wood and other porous materials and which also has good pot life.

2. Description of the Art

At present, urea resins, melamine-urea co-condensation resins and phenolic resins are used for the adhesives in the manufacture of plywood. The evolution of formaldehyde from these materials has been found to have adverse environmental effects. This evolution of formaldehyde is difficult if not impossible to avoid in the production of plywood and for this reason substitute adhesives have been sought. Various non-formaldehyde yielding water-based adhesive compositions have been suggested but many of them have inadequate water resistance and/or short pot lives as well as other disadvantages. One such adhesive system has been suggested in U.S. Pat. No. 3,931,088 wherein there is disclosed an adhesive comprising (1) an aqueous solution of polyvinyl alcohol, and (2) a hydrophobic solution of an isocyanate compound in an organic solvent. Such compositions can also contain an anionic surface active agent. In contrast, the adhesive compositions of the present invention require no organic solvent and no polyvinyl alcohol in them.

The Official Digest (Of the Federation of Societies for Paint Technology), February 1960, page 213 et.seq. discloses the formation of "blocked" or heat-latent isocyanates with alcohol and subsequent reaction of these materials with amine bearing resins at about 150° C. to form coatings. No amine-bearing resins are required in our invention.

SUMMARY OF THE INVENTION

In accordance with the present invention there is provided a water-based adhesive and coating composition which has excellent pot life (in excess of 40 hours at room temperature) and produces coatings and adhesive bonds which have excellent strength and water resistance and are devoid of any formaldehyde or formalin evolution during use or storage. The compositions of this invention are made up of two main aqueous systems; namely, (1) an aqueous latex, emulsion or dispersion of a vinyl homopolymer or interpolymer of two or more vinyl monomers, and (2) an aqueous emulsion or dispersion of a polyisocyanate which has undergone at least partial reaction between some of its isocyanate groups with a monohydroxy alcohol having the formula ROH wherein R is a hydrocarbon radical containing at least one carbon atom and preferably R contains from six to thirty carbon atoms and wherein aqueous emulsion or dispersion (2) is stabilized with an emulsion stabilizer composed of a surfactant and an alcohol having the structure R'OH wherein R' is a hydrocarbon radical containing at least one carbon atom and more preferably wherein R' contains from six to thirty carbon atoms.

Vinyl monomers useful in the present invention include the methyl, ethyl, propyl, isopropyl butyl, isobutyl, pentyl, and other similar esters of acrylic, methacrylic, ethacrylic, propacrylic, chloroacrylic, and bromoacrylic acids; the phenyl, benzyl and phenethyl esters of the aforementioned acids; vinyl aromatic hydrocarbons, such as styrene, vinyl toluene, dimethyl styrenes, trimethyl styrenes, ethyl styrenes, methyl ethyl styrenes, t-butyl styrenes, chloromethyl styrenes; mono chloro styrenes, dichloro styrenes, cyanostyrenes, vinyl naphthalenes, n-vinyl carbazole and vinyl thiophenes; the vinyl esters of saturated aliphatic monocarboxylic acids such as vinyl acetate, vinyl propionate, vinyl butyrate and vinyl valerate; vinyl versatate; alkyl vinyl ketones such as methyl vinyl ketone, ethyl vinyl ketone and methyl isopropenyl ketone; diesters of itaconic acid, maleic acid and fumaric acid; alkyl esters of unsaturated monocarboxylic acids as well as the acids themselves; nitriles containing a single vinyl group such as acrylonitrile and methacrylonitrile. The use of polyvinyl monomers such as divinyl-benzene, vinyl acrylate, butadiene, isoprene, and chloroprene is within the scope of the invention.

Particularly useful homopolymers and interpolymers of vinyl monomers for the purpose of this invention can include polymers and interpolymers of one or more monomers including vinyl acetate, vinyl chloride, vinylidene chloride, styrene, vinyl toluene, acrylonitrile, methacrylonitrile, acrylic ester, methacrylic esters, ethylene, isobutylene, butadiene, and isoprene.

Polyisocyanates useful in this invention are organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene 1,3-diisocyanate, p-phenylene diisocyanate, 1-methyl phenylene-2,4-diisocyanate, naphthalene-1,4-diisocyanate, O,O-toluene diisocyanate, diphenyl-4,4'-diisocyanate, benzene-1,2,4-triisocyanate, xylylene-1,4-diisocyanate, xylylene-1,3-diisocyanate, 4,4', diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two as more full disclosed in U.S. Pat. Nos. 3,350,362 and 3,382,215. Polyisocyanates which are polymeric in nature including isocyanate prepolymers of all types are included in this invention.

Alcohols of the type ROH and R'OH mentioned above in which R and R' are independently selected which are most useful in this invention are preferably aliphatic mono alcohols including n-hexyl alcohol, n-heptyl alcohol, n-octyl alcohol, n-nonyl alcohol, n-decyl alcohol, lauryl alcohol, myristyl alcohol, cetyl alcohol, stearyl alcohol, arachidyl alcohol, behenyl alcohol, isohexyl alcohol, 2-ethyl hexanol, 2-ethyl isohexanol, iso octyl alcohol, isononyl alcohol, isodecyl alcohol, isotridecyl alcohol, isocetyl alcohol, isostearyl alcohol, oleyl alcohol, linoleyl alcohol and the like.

The surfactants which in combination with the alcohols R'OH which are useful in stabilization of the at least partially modified polyisocyanate emulsions of this invention can be one or more of any of the well-known anionic, cationic and nonionic surfactants. It is usually advantageous to use anionic surfactants because such surfactants are most commonly used in the preparation of the vinyl polymer latices used in this invention and for purposes of compatibility the same type of surfactant is desired in both aqueous systems (1) and (2) of this invention. Anionic surfactants which are particularly useful in this invention include alkyl sulfonates, sulfonated aliphatic amines and amides, diphenyl sulfonates, ethoxylated fatty acids, lignin and lignin derivatives, olefin sulfonates, alkyl and inorganic phosphates, polyamine and carboxylic acids, sulfosuccinates, and alcohol sulfates, ethoxylated alcohol sulfates, sulfates and sulfonates of ethoxylated alkyl phenols, sulfates on fatty esters, sulfates and sulfonates of oils and fatty acid, alkyl aryl sulfonates, sulfonates of benzene, toluene, and xylene, sulfonates of condensed naphthalenes, sulfonates of dodecyl and tridecyl benzenes, sulfonates of naphthalene and alkyl naphthalenes, sulfonates of petroleums, tridecyl and dodecyl benzene sulfonic acids, taurates, and the like.

PREFERRED EMBODIMENT

The vinyl polymer latex which constitutes part (1) of this invention can be made by well-known emulsion polymerization techniques involving the polymerization of the vinyl monomer or monomers in aqueous emulsion with a free radical polymerization initiator. Emulsion stability is maintained by means of the usual surfactants emulsion stabilizers, suspending agents and the like as is well known to those skilled in the art.

The organic phase of the polyisocyanate emulsion (2) of this invention is composed of at least one polyisocyanate in which at least some of the isocyanate groups have been allowed to react with an alcohol ROH to form an at least partially modified isocyanate. This organic phase is prepared by the treatment of from about 0.032 to 0.22 equivalents of ROH per isocyanate equivalent of the polyisocyanate. The emulsifier component in (2) can be present in from about 1 to 3 parts by weight of the modified isocyanate organic phase with the ratio of R'OH to surfactant in the emulsifier falling in the range of about 2 to 4%.

The alcohol modified polyisocyanate emulsions (2) of this invention can be prepared by conventional methods. Batch preparation of the emulsions can be effected by adding a mixture of the modified isocyanate and emulsifying agent to vigorously agitated water or conversely, the water may be added to the isocyanate emulsifier mixture. The alcohol modified polyisocyanate can also be added to the aqueous emulsifier mixture. Very uniform emulsions are obtained by using homogenizing equipment, but any high speed mixing device can be used. Continuous preparation of the emulsions can be performed by feeding the components at controlled rates into a high shear mixing zone. Although it is preferred that these emulsions contain from about 65–75% by weight of the organic component, the concentrated emulsions can also be diluted to any desired concentration by the addition of water. The emulsions, however, can be prepared directly at low concentrations if so desired.

The compositions of the present invention composed of mixtures of (1) and (2) parts as described above exhibit tenacious adhesions to fibrous, non-fibrous, porous and non-porous, flexible and rigid, metallic and non-metallic, polymeric, leather, cork, wood and glass surfaces.

In addition to their use as an adhesive and coating agents the compositions of this invention are ideally suited for use as impregnants, saturants or sealants for porous substances of many types. Where flexible substrates are involved, the in situ reaction of the reactive components confers strength and rigidity. In the case of moisture sensitive substrates, the presence of the compositions of this invention decreases water sensitivity and this makes them particularly valuable for treating wood, paper, paper board, textiles, and the like. In addition to applications to paper, the compositions of this invention can be used for stiffening, reinforcing, waterproofing, or modifying a variety of foam plastic fabrics and specialty papers derived from natural and synthetic fibers such as asbestos, cellulose, flax, nylon and the like. The compositions of this invention can be used to seal wood and porous masonry such as concrete, mortar, plaster, stone and brick. The compositions of this invention can also be used as adhesives for binding wood chips, ground leather, ground cork, sand, glass fibers, carbon fibers and similar substances into sheet or molded forms. They are also useful as adhesives for laminating sheet materials such as wood, paper and cloth into plied products. They can also be used as flocking adhesives, binders for non-woven fabrics and soil treating agents.

The coating adhesive compositions of this invention can be applied to the substrates in any suitable manner as by dipping, padding, brushing, wiping, roller coating, spraying and the like. These compositions can also contain antioxidants, pigments, fillers, resins and plasticizers if so desired. Fillers can also include wheat flour, starches, soybean powder, wood powder, clay, kaolin, talc, titania, carbon, waterglass and the like.

In this practice of this invention the polymer latex (1) is blended with the modified polyisocyanate emulsion (2) and the blend is applied to a surface (wood, plastic, fabric, metal, etc.) which then may be brought in contact with another surface which may be the same or another material. The adhesive is then allowed to cure by standing at ambient temperature. The cure can be accelerated if desired by application of heat or electromagnetic radiation.

The invention is further illustrated in the following examples:

EXAMPLE I (1) An aqueous latex of a vinyl acetate n-butyl acrylate copolymer (85/15 parts by weight, respectively) having a solids content of approximately 64% by weight was employed.

(2) An emulsifier mixture was prepared using 2 g. of hexadecanol, 2 g. of a water soluble octyl phenoxy ethanol containing 10 moles of condensed ethylene oxide (triton×100, Rohm & Hass Co.) and 13 g. of a 70% aqueous solution of sodium bis-tridecyl sulfosuccinate. The resulting mixture was stirred gently until it was homogenous.

(b) A mixture of 200 g. of a polymethylene polyphenyl isocyanate having an isocyanate content of about 31.5% (Mondur MR, Mobay Chemical Corp.) and 60 g. of isocetyl alcohol (a 23.08% solution of isocetyl alcohol in Mondur MR) was shaken in a closed bottle until the resulting exotherm subsided.

(c) To grams of the emulsifier described in 2 (a) above were homogenized together with 50 g. of deionized water. To this aqueous surfactant dispersion were added 100 g. of the modified isocyanate described in 2 (b) above and this mixture was homogenized by stirring at about 1000 RPM. (3) A mixture of 100 g. of the latex described in (1) above and 22.01 g. of the modified isocyanate emulsion described in 2 (c) above was made and constituted an adhesive formulation in accordance with this invention.

EXAMPLE II

The adhesive and coating emulsion described in Example I (3) was evaluated on maple wood substrates. The adhesive was applied to maple sheets precut to the dimensions of 4"×6.5"×⅛" (wood grain in the 4" direction) at a spread rate of 28.85 pounds of solid per 100 sq. ft. of surface on one surface only. The sheets were pressed together for 20 hours at 175 pounds per square inch pressure at ambient temperature. The resulting panels were allowed to stand for three days at ambient temperature and they were then cut into test specimens measuring 4"×⅜×⅛".

The adhesive bonded maple wood specimens were conditioned in one of the following ways:

(a) half the specimens were lapshear (ASTM D2339-70) tested at ambient conditions the fourth day;

(b) one the third day the remaining half of the samples were immersed into 60° C. deionized water for four hours, subsequently dried at 42' C. for 19 hours and then lapshear tested on the fourth day.

Shear testing on the test samples was performed on an Instron machine. Tensile shear strength and work to break were evaluated at a cross head speed of 0.1 inches per minute and a chart speed of 5.0 inches per minute.

A control adhesive made in accordance with U.S. Pat. No. 3,931,088 was also used in these tests. In test (a) above the control adhesive formulation was found (average of at least four test specimens) to have a lapshear tensile of 861.3 p.s.i. whereas the adhesive formulation of Example I (3) was found (average of at least four test specimens) to have a lapshear tensile of 1,532.2 p.s.i. In test (b) above the control was found to have a lapshear tensile of 470.9 p.s.i. and the adhesive formulation of Example I (3) was found to have a lapshear tensile of 824.5 p.s.i.

when the adhesive formulation described in Example I (3) was aged at room temperature for about 30 days before use in test (a) above, essentially no change occurred in the lapshear tensile.

EXAMPLE III (1) An aqueous latex of styrene/butadiene (60/40 parts by weight, respectively) copolymer having a solids content at about 48% by weight was used.

(2) (a) An emulsifier was prepared as described in 2 (a) of Example I above. (b) A 16.7% isocetyl alcohol solution in Mondur MR was prepared as in 2 (b) of Example I above.

(c) The homogenized isocyanate preparation of 2 (b) above was prepared in the same manner as described in 2 (c) in Example I above.

(3) A mixture of 100 g. of the latex in (1) above, 0.4 g. of Gantrez M154 (poly methyl vinyl ether from GAF Corp.) and 13.2 g. of the modified isocyanate emulsion described in 2 (c) above formed the adhesive composition of this Example.

When the adhesive (3) of this Example was tested by the procedure of Example II (a) similar results in the lapshear test were observed and the shelf life of this adhesive formulation was found to be excellent.

EXAMPLE IV

1. An aqueous latex that is identical to that described in (1) of Example I above was utilized.

(2) (a) An emulsifier was prepared by the method described in 2 (a) of Example I above.

(b) A mixture of 200 g. of hexamethylene diisocyanate trimer (Desmodur KL 5-2444, Mobay Chemical Corp. having an isocyanate content of about 20%, and 20 g. of isocetyl alcohol. (A 9% solution of isocetyl alcohol in the polyisocyanate was shaken in a closed container until the mixture was homogenous (about 6 hours).

(c) The modified isocyanate as described in (b) above was homogenized in water with emulsifier as described in 2 (c) of Example I above.

(3) A mixture of 100 g. of the latex described in (1) above and 15.43 g. of the isocyanate emulsion described in 2 (c) above constituted an adhesive within the scope of the invention.

When the adhesive described in (3) of this Example was tested by the procedure described in Example II the lapshear tensile in (a) was found to be 1,392.4 p.s.i. with 71% wood failure (indicating that the adhesive bond was stronger than the cohesive bonding of the wood itself) and the lapshear tensile in test (b) was 650.7 p.s.i.

We claim:

1. A composition of matter comprising a mixture of an aqueous latex emulsion or dispersion of (a) a member selected from the group consisting of a homopolymer of a vinyl monomer and an interpolymer of two or more vinyl monomers, and (b) a polyisocyanate which has undergone at least partial reaction of some of its isocyanate groups with a [alcohol] $C_6$–$C_{30}$ *monohydroxy alkanol.*

2. The composition of claim 1 wherein (b) is stabilized with an emulsion stabilizer composed of a surfactant and an alcohol having the structure R'OH wherein R' is a hydrocarbon radical having at least 1 carbon atom.

3. The composition of claim 1 wherein the monohydroxy alcohol in (b) is [one having the formula ROH wherein R is a hydrocarbon radical containing at least one carbon atom] *selected from the group consisting of n-hexyl alcohol, n-heptyl alcohol, n-octyl alcohol, n-nonyl alcohol, n*-decyl alcohol, lauryl alcohol, myristyl alcohol, cetyl alcohol, stearyl alcohol, arachidyl alcohol, behenyl alcohol, isohexyl alcohol, *2-ethyl hexanol, 2-ethyl isohexanol, isooctyl alcohol, isononyl alcohol, isodecyl alcohol, isotridecyl alcohol, isocetyl alcohol, isostearyl alcohol, oleyl alcohol, and linoleyl alcohol.*

4. The composition of claim 1 wherein (a) is an aqueous latex of a homopolymer of an interpolymer of a monomer or monomers selected from the group consisting of vinyl acetate, vinyl chloride, vinylidene chloride, styrene, vinyl toluene, acrylonitrile, methacrylonitrile, acrylic esters, methacrylic esters, ethylene, isobutylene, butadiene and isoprene.

5. The composition of claim 4 wherein the polyisocyanate of [(2)] (*b*) is a member selected from the group consisting of ethylene diisocyanate, trimethylene, diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene- 1,3-diisocyanate, 1,4-diisocyanato cyclohexane, cyclopentene 1,3-diisocyanate, p-phenylene diisocyanate, 1-methyl phenylene-2,4-diisocyanate, naphthalene-1,4-diisocyanate, O,O,-toluene diisocyanate, diphenyl-4,4'-diisocyanate, benzene-1,2,4-triisocyanate, xylylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and polymeric polyisocyanates.

6. A process comprising applying to at least one surface of a material a mixture of an aqueous latex, emulsion or dispersion of (a) a member selected from the group consisting of a homopolymer of a vinyl monomer and an interpolymer of two or more vinyl monomers, and (b) a polyisocyanate which as undergone at least partial reaction of some of its isocyanate groups with a $C_6$–$C_{30}$ monohydroxy [alcohol] *alkanol.*

7. A process which comprises (1) treating at least one surface of a material with a mixture of an aqueous latex, emulsion or dispersion of (a) a member selected from the group consisting of a homopolymer of a vinyl monomer and an interpolymer of two or more vinyl monomers, and (b) a polyisocyanate which has undergone at least partial reaction of some of its isocyanate groups with a $C_6$–$C_{30}$ monohydroxy [alcohol] *alkanol.*

* * * * *

UNITED STATES PATENT AND TRADEMARK OFFICE

CERTIFICATE OF CORRECTION

PATENT NO. : Re. 34,093

DATED : October 6, 1992

INVENTOR(S) : Clois E. Powell and Gary L. Linden

It is certified that error appears in the above-indentified patent and that said Letters Patent is hereby corrected as shown below:

On the title page, the Assignee Section should read:--Ashland Oil, Inc., a corporation of the Commonwealth of Kentucky, Ashland Kentucky--

On the title page, the Attorney of Record should read:--Mueller and Smith, LPA--

Signed and Sealed this

Twelfth Day of October, 1993

*Attest:*

*Attesting Officer*

BRUCE LEHMAN

*Commissioner of Patents and Trademarks*